(12) United States Patent
Niki (10) Patent No.: US 7,401,820 B2
(45) Date of Patent: Jul. 22, 2008

(54) CONNECTOR MOUNTING STRUCTURE

(75) Inventor: Nobuaki Niki, Inuyama (JP)

(73) Assignee: Tokai Rubber Industries, Ltd. (JP)

( * ) Notice: Subject to any disclaimer, the term of this patent is extended or adjusted under 35 U.S.C. 154(b) by 147 days.

(21) Appl. No.: 11/355,840

(22) Filed: Feb. 16, 2006

(65) Prior Publication Data

US 2008/0007052 A1   Jan. 10, 2008

(30) Foreign Application Priority Data

Feb. 18, 2005   (JP) .............................. 2005-041477

(51) Int. Cl.
*F16L 19/00* (2006.01)
(52) U.S. Cl. ...................... 285/376; 285/305; 285/401; 285/403
(58) Field of Classification Search ................. 285/190, 285/305, 376, 401–403
See application file for complete search history.

(56) References Cited

U.S. PATENT DOCUMENTS

| | | | | |
|---|---|---|---|---|
| 1,016,620 A | * | 2/1912 | Gapp | 285/388 |
| 2,835,305 A | * | 5/1958 | Boyer | 152/427 |
| 3,125,360 A | * | 3/1964 | Ulrich | 285/124.5 |
| 3,314,696 A | * | 4/1967 | Ferguson et al. | 285/148.14 |
| 3,435,997 A | * | 4/1969 | Johnston | 222/400.7 |
| 3,466,062 A | * | 9/1969 | Deplante | 285/145.2 |
| 4,874,174 A | * | 10/1989 | Kojima et al. | 285/82 |
| 2003/0052484 A1 | * | 3/2003 | Rautureau | 285/305 |

FOREIGN PATENT DOCUMENTS

| | | |
|---|---|---|
| DE | 4403063 | 8/1995 |
| JP | 10-103179 A | 4/1998 |
| JP | B2943722 | 6/1999 |

* cited by examiner

*Primary Examiner*—Aaron M Dunwoody
*Assistant Examiner*—Fannie Kee
(74) *Attorney, Agent, or Firm*—Andrus, Sceales, Starke & Sawall, LLP (57) ABSTRACT

A connector is inserted into a connection hole provided on a fluid piping equipment, and the connector is prevented from dropping out via a retainer held by a retainer holding portion. The connector has a connecting portion including a flange stop portion, and a positioning means is disposed between the connecting portion and the fluid piping equipment. This positioning means is to position the connecting portion in a circumferential direction so as not to rotate relative to the connection hole and has a mounting angle adjusting function capable of positioning the connecting portion in the circumferential direction selectively at any one of a number of mounting angular positions relative to the connection hole. An annular surface on the other end in the axial direction of the stop portion is formed in a taper shape tapered toward the other end in the axial direction.

7 Claims, 5 Drawing Sheets

CONNECTOR MOUNTING STRUCTURE

BACKGROUND OF THE INVENTION

1. Field of the Invention

The present invention relates to a mounting structure of a connector used for a fluid piping connection of a motor vehicle and so on, and for example, to a connector mounting structure mounting a connector for coupling a tube to a fuel pump of the motor vehicle.

2. Description of the Related Art

A tube for constituting a gasoline fuel piping is coupled to a fuel pump provided on a gasoline fuel tank of a motor vehicle. The communication of the tube with the fuel pump is performed in a mode as stated below: a connection hole is formed in a cap of the fuel pump, and a quick connector to which the tube is fitted to be connected is inserted into the connection hole and mounted to the cap. As the quick connector for coupling the fuel pump and the tube, the one is used in which a tube fitting portion is integrally formed in a bending state on one end in an axial direction of a cylindrical connecting portion, and, on an outer periphery of the tube fitting portion, for example, a tube made of resin is tightly fitted.

As a connector mounting structure for mounting the quick connector to the fuel pump, for example, the one described in Patent Document 1 is known. In this connector mounting structure, at first, a connecting portion of a quick connector is rotatably inserted into a connection hole (opening portion) formed in a cap of a fuel pump. A retainer holding portion (clip holding portion) is provided in a vicinity of an opening of the connection hole on a surface of the cap, and a retainer in a horseshoe shape is inserted to be fixed or mounted to this retainer holding portion so as to be engaged with an outward flange stop portion (flange stopper portion) formed on the connecting portion in locked relation, to thereby complete the mounting of the quick connector. Here, a thin stop portion and the retainer are used to prevent the quick connector from dropping out, and therefore, it becomes possible to suppress a protruding amount of the connector from the cap to be small. Besides, a general versatility can be secured capable of corresponding to piping structures of various vehicle type, because the quick connector can be rotated flexibly according to a direction of the tube even through the vehicle type is different and the direction of the tube extending from the fuel pump is different.

[Patent Document 1] Patent Publication No. 2943722

However, when the quick connector is mounted to the fuel pump in a rotatable state, and a direction in which the tube fitting portion is extending can be variable, there is a possibility that the tube swings to be in contact or abut with peripheral parts to cause the tube to be scratched or damaged, when a pressure of an inner fluid flowing in the tube may be fluctuated or an impact may be added from a vehicle body side. Consequently, it is necessary to constitute a structure for fixing the tube additionally when the connector mounting structure described in the Patent Document 1 is used.

Besides, in the connector mounting structure described in the Patent Document 1, the retainer is mounted to the retainer holding portion after the quick connector is inserted into the connection hole, in order to prevent the quick connector from dropping out, and therefore, a mounting work is complicated.

An object of the present invention is to provide a connector mounting structure having a wide adaptive range, capable of securing a stable piping structure, and capable of being constituted easily.

SUMMARY OF THE INVENTION

A connector mounting structure according to the present invention to attain this object includes a structure in which, a fluid piping equipment such as a fuel pump and a fuel tank is provided with a connection hole, a retainer (for example, in a horseshoe, or approximately horseshoe shape) is held by a retainer holding portion formed in a vicinity of an opening of the connection hole, a connector is inserted into (for example, plugged in) the connection hole and prevented from dropping out via the retainer to thereby be mounted to the fluid piping equipment. The connector includes: a connecting portion having a cylindrical seal portion (for example, the other end portion in an axial direction) which is inserted into (for example, plugged in) the connection hole and sealed with respect to the connection hole by a seal member, and a flange stop portion formed on one end in an axial direction of the seal portion and engaged with the retainer in locked relation, a tube fitting portion (widely including a fitting portion of a tubular body for a fluid such as a tube and a hose) formed on one end in the axial direction of the connecting portion in a bending state. A positioning means is disposed between the connecting portion of the connector and the fluid piping equipment. The positioning means has a first engaging portion provided in the connecting portion of the connector and a second engaging portion provided in the fluid piping equipment. The positioning means is to position the connector or the connecting portion of the connector in a circumferential direction so as not to rotate relative to the connection hole by engaging the first engaging portion and the second engaging portion in the circumferential direction. The positioning means has a mounting angle adjusting function capable of positioning the connecting portion in the circumferential direction selectively at any one of a number of mounting angular positions (mounting angular positions in the circumferential direction) relative to the connection hole. An annular surface on the other end in the axial direction of the stop portion is formed in a taper shape tapered toward the other end in the axial direction. Owing to the mounting angle adjusting function, it becomes possible to position the connecting portion in a circumferential direction, for example, respectively at a number of mounting angular positions of three positions or more, or for example, respectively at a number of mounting angular positions of four, five, six positions or more. The connecting portion or the seal portion of the connector may be inserted to be connected to an annular connection hole. Besides, the first engaging portion and the second engaging portion are engaged in the circumferential direction, for example, in response to insertion of the connecting portion or the seal portion of the connector into the connection hole.

In the present invention, it is constituted so that the first engaging portion and the second engaging portion are engaged in the circumferential direction to position the connecting portion of the connector in the circumferential direction when the connector is mounted. Consequently, when the connector is mounted to the fluid piping equipment, the connector is positioned so as not to rotate relative to the connection hole, and therefore, a direction in which the tube fitting portion extends may not be changed when it is used. Namely, the direction in which the tube fitting portion extends is held in constant during use. Further, the mounting angle adjusting function is provided, in which the connecting portion or the seal portion of the connector can be positioned at a number of mounting angular positions relative to the connection hole, and therefore, it becomes possible to mount the connector while adjusting the direction in which the tube fitting portion extends by selecting the mounting angular position of the connecting portion or the seal portion. For example, the connecting portion or the seal portion of the connector is inserted into the connection hole of the fluid piping equipment at the mounting angle (mounting angle in the circumferential direction or mounting rotation angle) where positions in the circumferential direction of the first engaging portion and the second engaging portion are matched. Here, the first engaging portion and the second engaging portion are engaged in the circumferential direction to thereby position the connecting portion in the circumferential direction. The mounting angles where the positions in the circumferential direction of the first engaging portion and the second engaging portion are matched are set, for example, at eight positions with equal spacing of 45 degrees.

In the present invention, the retainer held by the retainer holding portion is engaged with the flange stop portion in locked relation, and thereby, the connector of which connecting portion is inserted into the connection hole is prevented from dropping out relative to the fluid piping equipment. The stop portion is formed, for example, to have a larger outside diameter (larger outer diameter) than the seal portion. The retainer is formed, for example, in a horseshoe shape or approximately horseshoe shape to have a pair of engaging arms. However, if the annular surface on the other end in the axial direction of the stop portion is formed in a taper shape tapered toward the other end in the axial direction, it becomes possible to have a constitution in which the retainer or the engaging arms may not becomes an intervention for the insertion of the connecting portion or the seal portion into the connection hole, even if the retainer is held in the retainer holding portion in advance so that, for example, the engaging arms may position in a passage of the stop portion. The connecting portion or the seal portion of the connector is, for example, inserted into the connection hole passing between the pair of engaging arms of the retainer. The annular surface on the other end in the axial direction of the stop portion passes between the engaging arms, for example, so as to press to widen an interval of the pair of the engaging arms, when the connecting portion or the seal portion is inserted into the connection hole. The retainer constitutes a stop structure by being positioning, for example, between the stop portion and the retainer holding portion. The retainer is, for example, held by the retainer holding portion so as not to move in a direction in which the connector is dropped out of the connection hole.

It is possible to form the pair of the engaging arms of the retainer so as to be snap engaged with the annular surface on one end in the axial direction of the stop portion when the stop portion passes through the engaging arms, to secure an easy and certain stop function of the connector. Further, it is effective that the seal portion or the seal member has a smaller outside diameter than the interval between the pair of engaging arms of the retainer (the interval when a force to press to widen does not act).

For example, when an annular seal member is provided on an outer peripheral surface of the seal portion, the annular seal member is formed to have a smaller outside diameter than the interval of the pair of engaging arms of the retainer (the interval when the force to press to widen does not act), so as to prevent the annular seal member of the seal portion is rubbed and scratched by the retainer or the engaging arms when the connecting portion of the connector is inserted into the connection hole. The annular seal member is, for example, provided to slightly protrude outside in a radial direction from an outer peripheral surface of the seal portion. Namely, the outside diameter of the annular seal member is, for example, slightly larger than the outside diameter of the seal portion.

The retainer holding portion can be formed in an annular body or approximately annular body with a through-hole. Besides, it can be constituted so that the seal portion and the stop portion pass inside of the retainer holding portion (through hole) in the annular body or approximately annular body, when the seal portion is inserted into the connection hole. In case of such a constitution, it is preferable that the second engaging portion, engaging with the first engaging portion provided in the outer periphery of the connecting portion of the connector, is provided in the through hole of the retainer holding portion so that the inserting connection operation of the connector becomes easy. Bedsides, it is effective that the first engaging portion is provided in the outer periphery of the connecting portion, and on one end in the axial direction with respect to the stop portion.

To secure a certain rotation stop function or anti-rotation function with an easy constitution, one of the first engaging portion and the second engaging portion is formed as an engaging protruding portion, and the other is formed as an engaging recessed portion capable of fitting on the engaging protruding portion. Namely, it is possible that the first engaging portion is made to be the engaging protruding portion or the engaging recessed portion, and the second engaging portion is made to be the engaging recessed portion or the engaging protruding portion fitting to this first engaging portion to engage therewith in the circumferential direction. Besides, the engaging recessed portions are arranged, for example, in an annular state or in a circular state, and provided more than the number of the engaging protruding portion (one or more), and thereby the mounting angle adjusting function can be constituted. For example, the first engaging portion is set to be the engaging protruding portion, the second engaging portion is set to be the engaging recessed portion fitting on this engaging protruding portion to engage therewith in the circumferential direction, and the engaging recessed portions are provided more than the number of the engaging protruding portions along the circumferential direction in the through hole of the retainer holding portion, and then, a mounting angle adjustment of the tube fitting portion can be performed easily by selecting the engaging recessed portion with which the engaging protruding portion is fitted to be engaged. Incidentally, for example, when a plurality of the engaging protruding portions are arranged, equally spaced in the circumferential direction, the number of the engaging recessed portion may be equal to or more than the number of the engaging protruding portions. The mounting angle of the tube fitting portion can be adjusted effectively with the constitution as stated here. The number of the engaging recessed portion may be equal to or more than the number of the engaging protruding portion.

According to the connector fixing structure of the present invention, it is possible to position the tube fitting portion extending in an appropriate direction when the connector is mounted, and a complex arranging operation of the retainer becomes unnecessary.

Hereinafter, embodiments of the present invention are described with reference to the drawings.

DETAILED DESCRIPTION OF THE PREFERRED EMBODIMENTS

In the connector mounting structure in FIGS. 1 to 4, a connection hole 11 into which a connecting portion 9 of a cylindrical quick connector 7 is inserted, is formed on a cap 5 of a fuel pump 3 attached to a fuel tank 1 of a motor vehicle, and a retainer holding portion 15 to hold a wire retainer (wire member retainer) 13 is integrally provided around an opening of this connection hole 11.

The quick connector 7 has a tube fitting portion 19 formed on one side in an axial direction (outside of the axial direction) of the connecting portion 9 in a state bending 90 degrees, namely in a state bending just laterally, in which a number of annular stop protrusions 17 are provided on an outer periphery, and integrally is formed by using resinous material such as fiber reinforced PA (polyamide) or fiber reinforced POM (polyacetal). An annular stop portion 21 in an outward flange state or in a flange state is integrally provided at a center in the axial direction of the cylindrical connecting portion 9 of the quick connector 7. An outside diameter of the connecting portion 9 is set so that one end in the axial direction with respect to the annular stop portion 21 becomes a little bit larger than the other end in the axial direction (inside of the axial direction). The other end in the axial direction of the connecting portion 9 with respect to the annular stop portion 21 is constituted as a seal holding portion 23 (seal portion), two annular fitting grooves 25, 25 are formed on an outer peripheral surface of the seal holding portion 23, and O-rings 27 are fitted into the respective annular fitting grooves 25. The outer peripheral surface of the seal holding portion 23 (outer peripheral surface other than the annular fitting grooves 25) is formed so as to have an equal outside diameter for a whole length in the axial direction, and the O-rings 27 are disposed so as to slightly protrude outside in a radial direction from the outer peripheral surface of the seal holding portion 23, for example, to have an equal outside diameter with the outside diameter of one end in the axial direction of the connecting portion 9 with respect to the annular stop portion 21. Besides, an engaging piece 29 (first engaging portion, engaging protruding portion) protruding outside in the radial direction is integrally formed on one end in the axial direction with respect to the annular stop portion 21 and on one location in a circumferential direction of the outer peripheral surface of the connecting portion 9 of the quick connector 7. Incidentally, here, the engaging piece 29 or the first engaging portion is provided as only one, but the engaging pieces 29 or the first engaging portions can be provided in plural on the outer peripheral surface of the connecting portion 9. In this case, the engaging pieces 29 or the first engaging portions can be formed so as to be symmetric in the radial direction, or to be equally spaced in the circumferential direction, for example, eight at 45 degrees interval.

A cylindrical portion 31 is integrally formed on the cap 5 protruding inside so as to extend into the fuel tank 1, and the connection hole 11 is penetratingly provided from a surface of the cap 5 to an inner end of the cylindrical portion 31. The connection hole 11 has an inside diameter which is approximately equal to the outside diameter of the seal holding portion 23 or slightly larger than the outside diameter of the seal holding portion 23 on one end in the axial direction, has an inside diameter which is smaller than the outside diameter of the seal holding portion 23 on the other end in the axial direction, and includes an annular abutting surface 33 for stopping insertion at a midpoint in the axial direction. Besides, an opening or opening portion on the cap 5 side of the connection hole 11 is formed as a fitting portion 35 having a large diameter, and this fitting portion 35 has approximately the same shape with an outline of the annular stop portion 21 of the quick connector 7. Incidentally, a circular region 37 in a vicinity of the opening of the connection hole 11 on the surface of the cap 5 is formed to protrude from the surface so as to be raised slightly.

Figure 1:
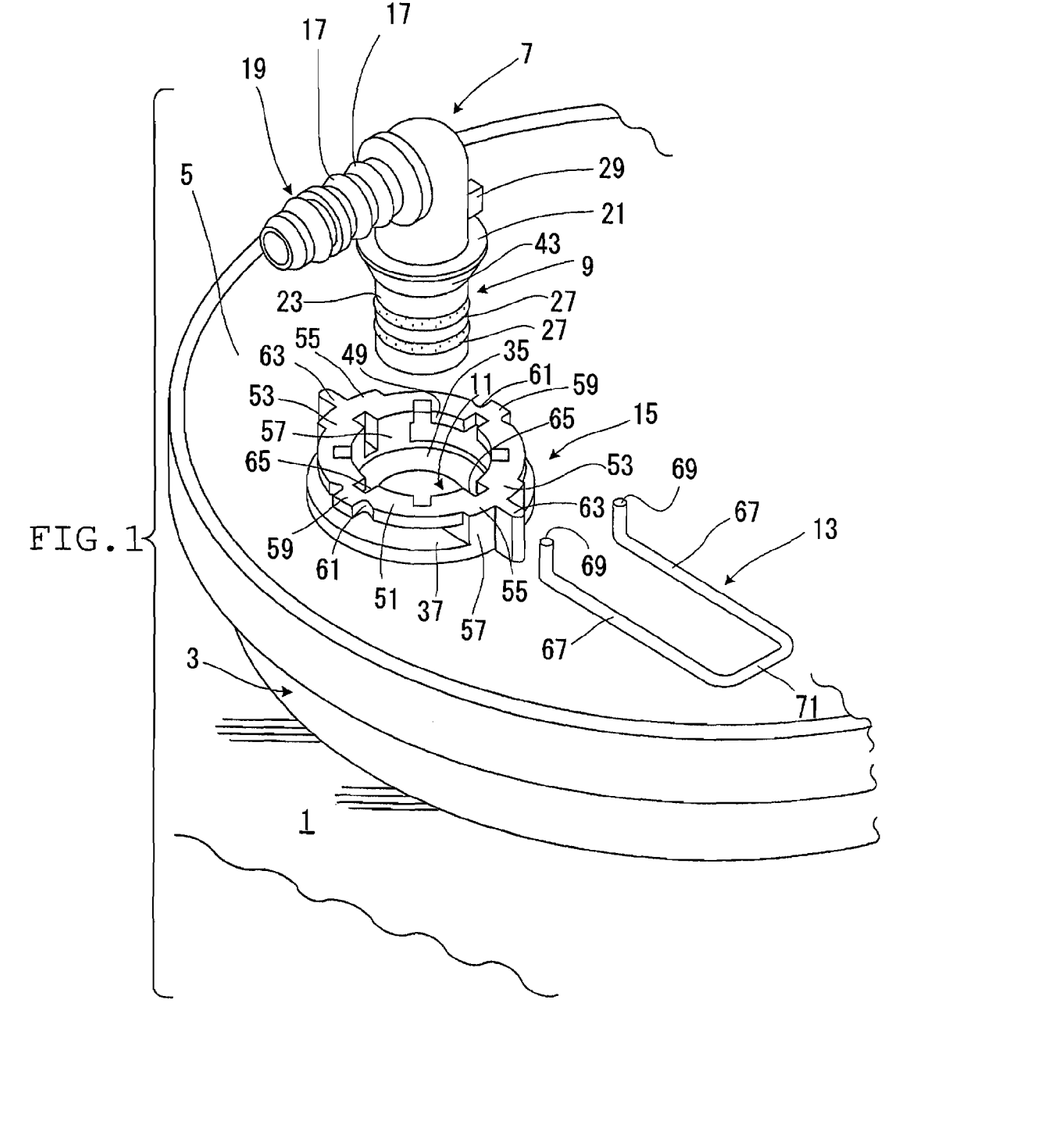
FIG. 1 is a perspective view explaining a case when a quick connector is fixed to a fuel pump of a motor vehicle by using a connector mounting structure according to the present invention.
Figure 2:
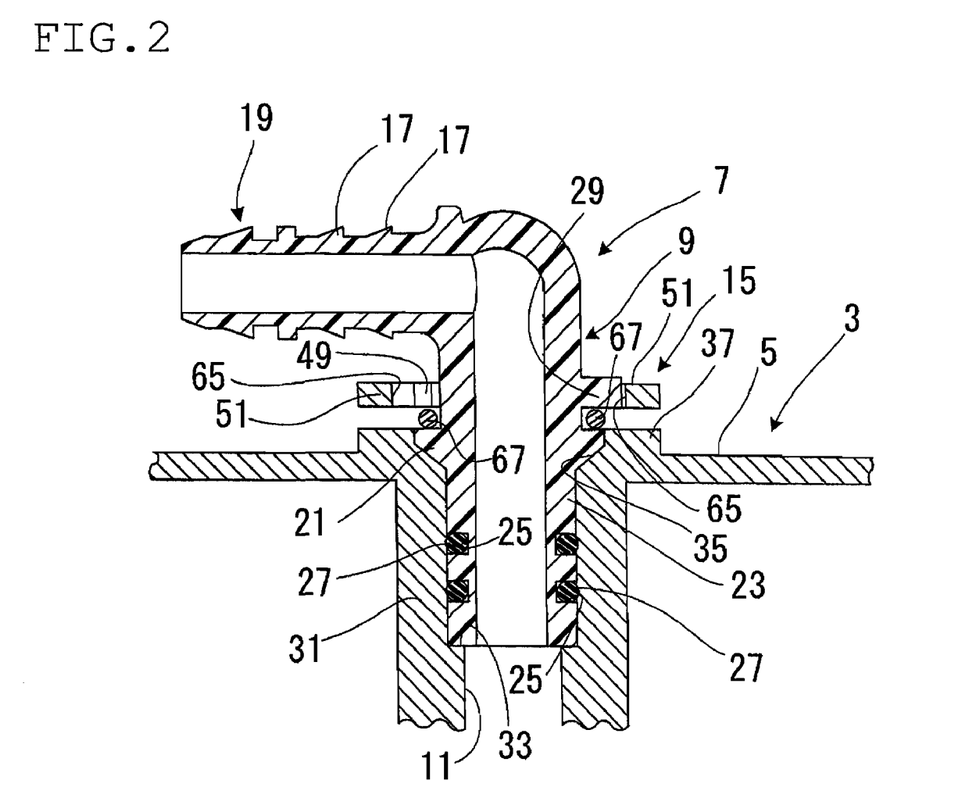
FIG. 2 is a sectional view showing the connector mounting structure.
Figure 3:
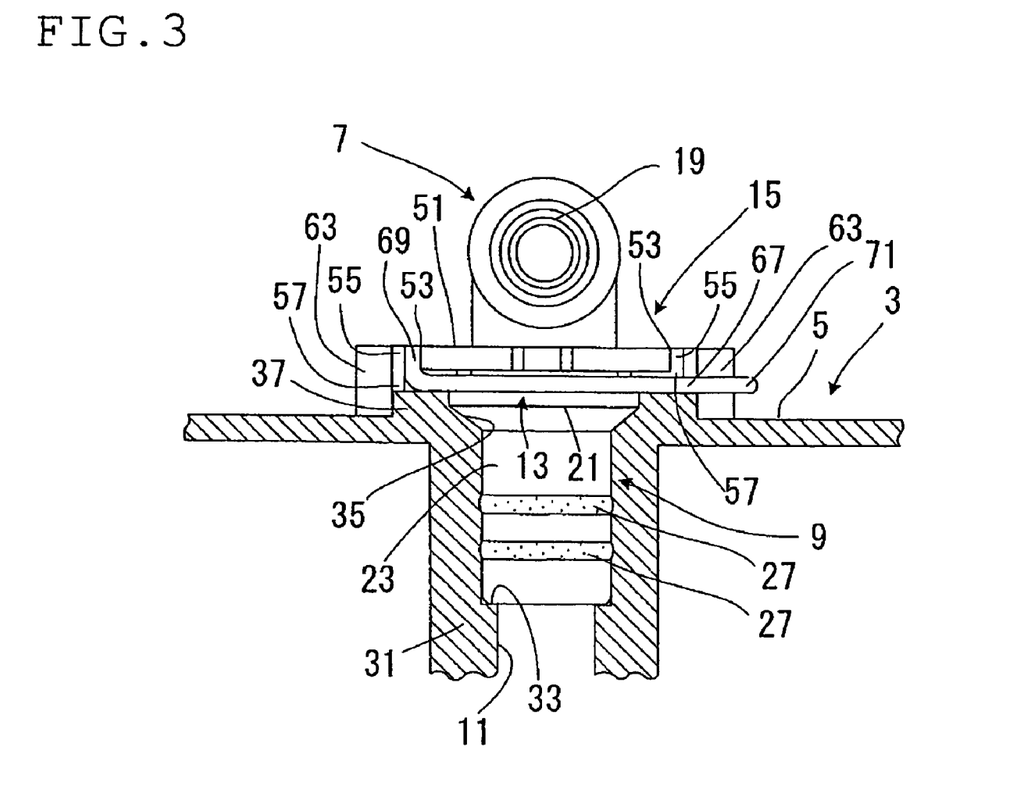
FIG. 3 is a side elevation view showing the connector mounting structure.
Figure 4:
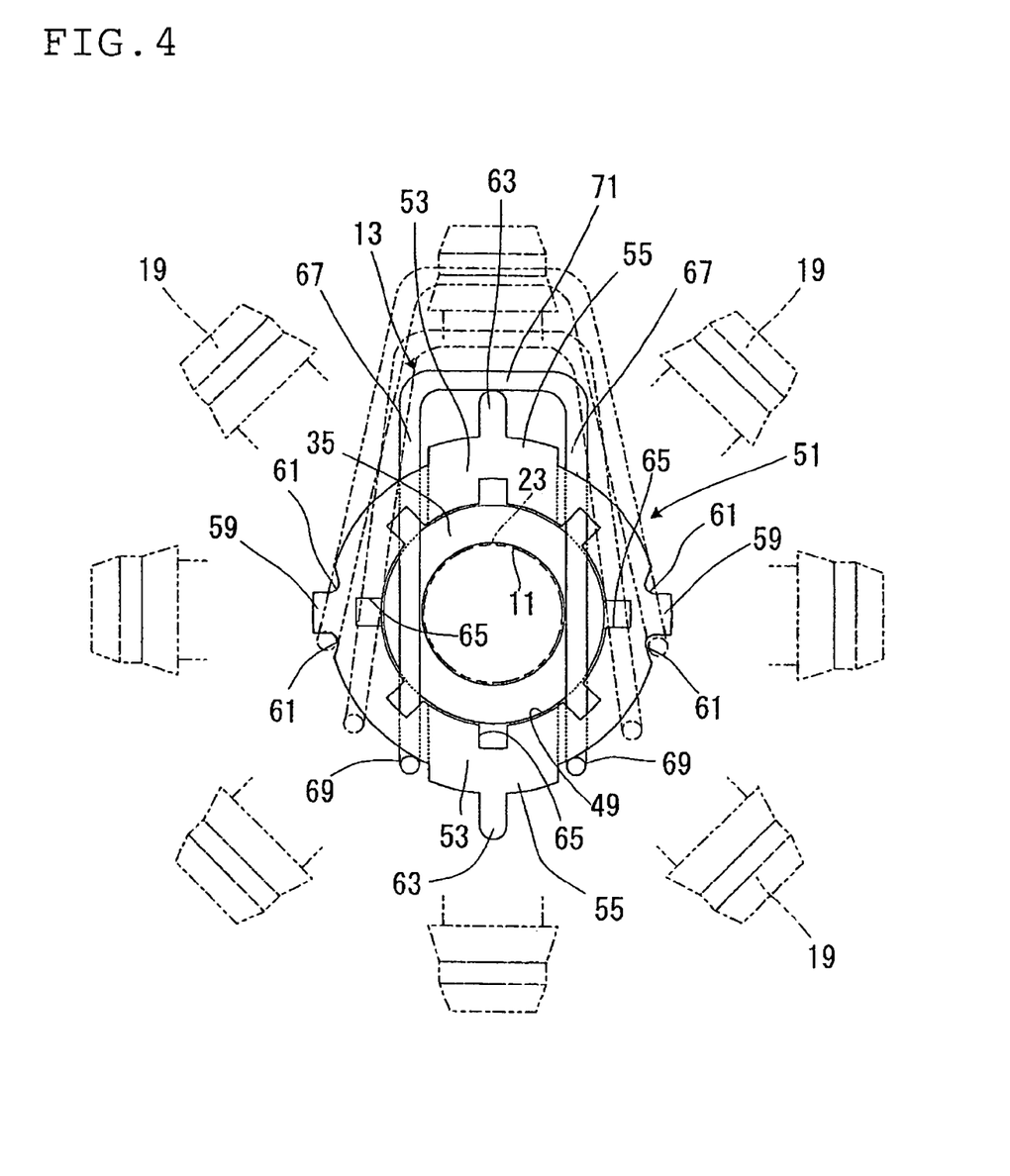
FIG. 4 is a plan view showing in a vicinity of a connection hole of the connector mounting structure.
Figure 5:
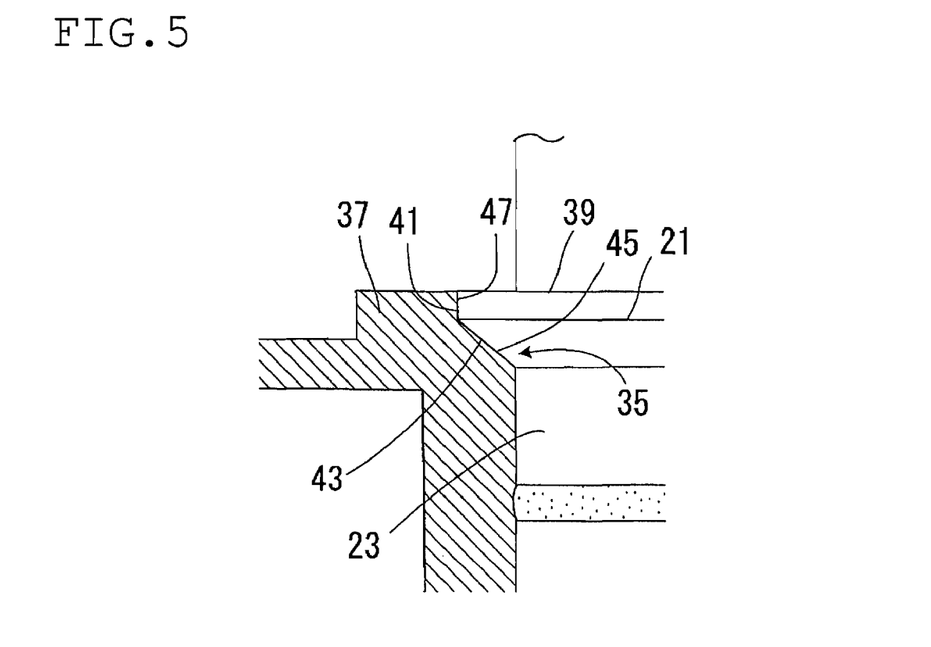
FIG. 5 is a view showing a detail of a part of an annular stop portion.

As shown in FIG. 5 in detail, an outer surface of the annular stop portion 21 provided on one end in the axial direction of the seal holding portion 23 is formed with an annular engaging surface portion 39 on one end in the axial direction, a cylindrical outer peripheral surface portion (outer peripheral surface portion of same diameter) 41 slightly extending from an outer peripheral edge of the engaging surface portion 39 to the other end in the axial direction, and an annular enlarging diameter surface portion 43 on the other end in the axial direction extending from the other end in the axial direction of the cylindrical outer peripheral surface portion 41 to one end in the axial direction of the outer peripheral surface of the seal holding portion 23. The engaging surface portion 39 is broadened in an orthogonal direction relative to the axial direction, and the enlarging diameter surface portion 43 becomes a taper surface tapered toward the other end in the axial direction (FIG. 5 is a view to show a detail of a part of the annular stop portion 21). The fitting portion 35 is formed to accommodate this annular stop portion 21, and includes a taper portion 45 to house the enlarging diameter surface portion 43 of the annular stop portion 21 and a cylindrical inner peripheral portion 47 to house the cylindrical outer peripheral surface portion 41. The engaging surface portion 39 of the annular stop portion 21 is formed to be in a coplanar state with a surface of the circular region 37 (surface of the cap 5) when the connecting portion 9 of the quick connector 7 is completely inserted into the connection hole 11, the other end in the axial direction of the seal holding portion 23 abuts the annular abutting surface 33, and the enlarging diameter surface portion 43 of the annular stop portion 21 becomes in an entire contact state with the taper portion 45 of the fitting portion 35.

On the surface side of the cap 5, a frame body in a ring state (annular body or annular frame body) 51 in which an inner peripheral surface or through-hole 49 having approximately the same inside diameter with the cylindrical inner peripheral portion 47 of the fitting portion 35 is formed, is disposed as a retainer holding portion 15 in the vicinity of the opening of the connection hole 11. This frame body 51 is integrally provided on the surface of the cap 5 so as to slightly float up from the circular region 37 on the surface of the cap 5 and to locate the through hole 49 in concentric state with the connection hole 11. The frame body 51 has positioning portions 53, 53 on a pair of locations being symmetric in the radial direction, and each positioning portion 53 is formed to have an outer edge portion 55 protruding outside in the radial direction. Positioning support table portions 57, 57 slightly higher than a wire diameter of a wire retainer 13 are integrally formed over all the positioning portions 53 between the positioning portion 53, 53 and the surface of the circular region 37 of the cap 5. Consequently, an interspace slightly larger than the wire diameter of the wire retainer 13 is formed between the frame body 51 and the surface of the circular region 37 of the cap 5. Stoppers 59, 59 protruding outside in the radial direction are respectively formed at a center between the positioning portions 53, 53 on the outer peripheral edge of the frame body 51. Holding recessed portions 61, 61 are provided at root portions of both sides in the circumferential direction of the respective stoppers 59. Besides, at outer edges of the positioning portions 53, 53 (outer edge portions 55, 55) of the frame body 51, abutting pieces 63 protruding outside in the radial direction are integrally formed respectively so as to extend from the surface of the positioning portion 53 until integrated with a side surface of the circular region 37 and a surface being outside more than the circular region 37.

Eight pieces of engaging grooves 65 (second engaging portion, engaging recessed portion) engaging with the engaging piece 29 formed on the connecting portion 9 of the quick connector 7 are formed with equal spacing in the circumferential direction in the through hole 49 of the frame body 51. Namely, the engaging grooves 65 are formed at 45 degrees interval all around along the through hole 49. The respective engaging grooves 65 are formed so as to be opened in the surface (outer surface), an inner surface (the other end surface in the axial direction), and an inner peripheral surface of the frame body 51, extending in the radial direction with approximately the same length with the protruding length of the engaging piece 29, and having approximately the same thickness with the thickness of the engaging piece 29. The height of the engaging piece 29 in the axial direction is formed to be larger than the thickness of the frame body 51 in the axial direction. The engaging piece 29 is formed to fit into the engaging groove 65 when the connecting portion 9 of the quick connector 7 is inserted into the connection hole 11.

The wire retainer 13 is formed by bending a wire or a wire member made of a metal, or molding processed with resinous material, into a horseshoe shape having a pair of engaging arms 67, 67 extending in parallel on both sides. An inside interval (inside interval in a lateral direction) of the engaging arms 67, 67 is set to be approximately equal to the outside diameter of one end in the axial direction of the connecting portion 9 of the quick connector 7 with respect to the annular stop portion 21 (more specifically, the outer diameter of the connecting portion 9 between the annular stop portion 21 and the engaging piece 29) and the width of the positioning portion 53 of the frame body 51, or to be slightly wider than the outside diameter of one end in the axial direction of the connecting portion 9 with respect to the annular stop portion 21 and the width of the positioning portion 53 of the frame body 51. Namely, the inside interval between the engaging arms 67, 67 is set to be narrower than the outside diameter of the annular stop portion 21 of the connecting portion 9 of the quick connector 7. Tip portions (free end portions) of the respective engaging arms 67 compose or form guide engaging portions 69, 69 bending in an orthogonal direction relative to a virtual plane including the engaging arms 67, 67. The wire retainer 13 in such a shape is disposed or assembled between the frame body 51 and the surface of the cap 5 (more specifically, the surface of the circular region 37) namely in such engaging position that a rear end (opposite end to the free end) of the engaging arms 67, 67 sandwiches one of the positioning support table portion 57, and the guide engaging portions 69, 69 sandwich the other positioning support table portion 57 and the outer edge portion 55 of the positioning portion 53, and a coupling portion 71 coupling the engaging arms 67, 67 becomes in an abutting state with the abutting piece 63 (here, the engaging arms 67 are positioned to get across the opening of the connection hole 11 and the through hole 49: refer to a solid line in FIG. 4). The respective guide engaging portions 69 slide along the outer peripheral edge of the frame body 51 from the positioning portion 53 to the stoppers 59 when they are pulled in a pull-out direction (a direction heading from the other positioning portion 53 to the one positioning portion 53), and then, the engaging arms 67, 67 open to be displaced to a retreat or a release position (refer to a virtual line in FIG. 4) so as to be positioned at outside of the opening of the connection hole 11 and the through hole 49. The wire retainer 13 is displaced to this release position, and then it is held at this release position, because the guide engaging portions 69 moved to the stoppers 59 are fitted inside of the holding recessed portions 61. Besides, when a large pressing force (a force heading from the one positioning portion 53 to the other positioning portion 53) is added to the wire retainer 13, the guide engaging portions 69 of the engaging arms 67 are slipped out of the holding recessed portions 61, an elastic return force of the engaging arms 67, 67 to a parallel state is also added, and the respective guide engaging portions 69 slide smoothly to the other positioning support table portion 57 and the outer edge portion 55 of the other positioning portion 53 along the outer peripheral edge of the frame body 51. As a result, the wire retainer 13 returns to the engaging position. At the engaging position, the rear end and the tip end of the engaging arms 67 are respectively engaged with the frame body 51 in the pull-out direction of the quick connector 7, and therefore, the wire retainer 13 is stably held in a parallel state with the frame body 51 and so as not to move in the pull-out direction of the quick connector 7. Incidentally, the frame body 51 is formed in symmetry relative to a line connecting the stoppers 59, 59, and therefore, it is also possible to attach the wire retainer 13 to the frame body 51 from the other positioning portion 53 end.

Here, the connecting portion 9 is inserted into the connection hole 11 from the through hole 49 so that the engaging piece 29 fits in the engaging groove 65 corresponding to a mounting angle of the connecting portion 9, to thereby engage the engaging piece 29 and the engaging groove 65 (positioning means) in the circumferential direction, to attach the quick connector 7 used for the connector mounting structure to the cap 5 of the fuel pump 3. Here, the engaging piece 29 is fitted selectively to or in the engaging groove 65, and thereby an orientation or extending direction of the tube fitting portion 19 is adjustable at eight directions or mounting angular positions. An extending direction of the tube fitting portion 19 is adjustable or selectable at 16 directions or less, more preferably, from four directions to eight directions.

Incidentally, in this connector mounting structure, it is possible to use a mounting method in which the wire retainer 13 is moved to the release position, the connecting portion 9 of the quick connector 7 is inserted into the connection hole 11 to be connected, and thereafter, the wire retainer 13 is returned to the engaging position. However, a mounting mode is also adoptable in which an inserting operation of the connecting portion 9 of the quick connector 7 is started under a state that the wire retainer 13 is disposed at the engaging position, and the connecting portion 9 is inserted into the connection hole 11 while the engaging arms 67, 67 of the wire retainer 13 are pressed to be widened by the annular stop portion 21 (more specifically, the enlarging diameter surface portion 43 of the annular stop portion 21). Here, the wire retainer 13 is not displaced to the release position even when the engaging arms 67, 67 are pressed to be most widened (refer to a dashed line in FIG. 4), and therefore, when the connecting portion 9 is completely or normally inserted to be connected to the connection hole 11, and the annular stop portion 21 passes between the engaging arms 67, 67, the wire retainer 13 pressed to be widened is elastically retuned and the engaging arms 67, 67 return to the parallel state to be snap engaged with the annular stop portion 21 (more specifically, the engaging surface portion 39 of the annular stop portion 21). Incidentally, when the inserting connection of the quick connector 7 is performed as stated above, the displacement of the wire retainer 13 to the release position is performed when the quick connector 7 is detached.

Incidentally, the outside diameter of the O-ring 27 provided on the seal holding portion 23 is set to be approximately equal to the inside interval of the engaging arms 67, 67 of the wire retainer 13 at the engaging position or slightly or in some degree smaller than the inside interval, and therefore, when the quick connector 7 is inserted to be connected, there is few possibility that the O-ring 27 is rubbed and scratched by the engaging arms 67 of the wire retainer 13.

Figure 6:
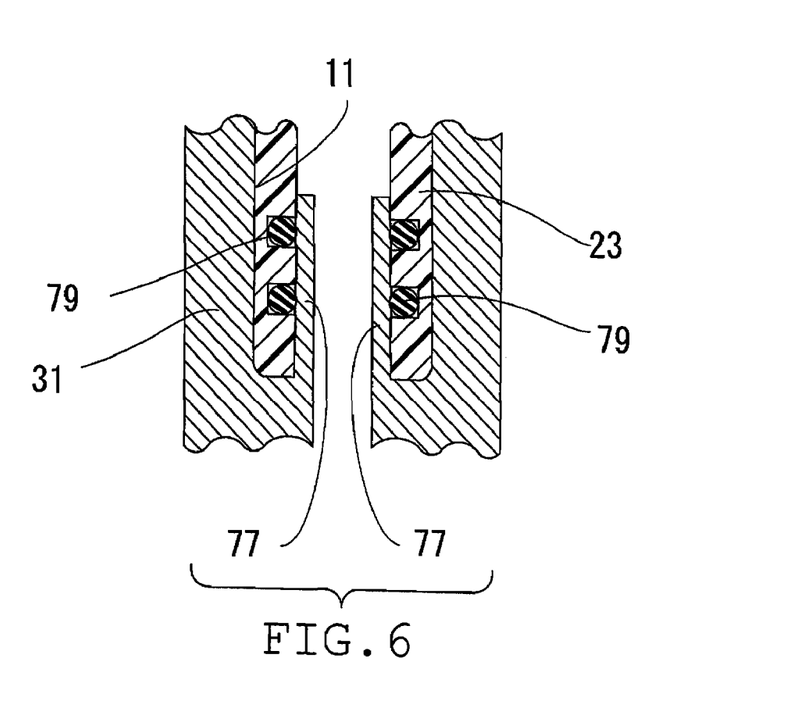
FIG. 6 is a view showing a modification example of an inserting connection structure of a seal holding portion.

Besides, as shown in FIG. 6, an inner cylinder portion 77 is formed inside of the connection hole 11, O-rings 79, 79 are fitted on an inner peripheral surface of the seal holding portion 23 of the quick connector 7, and the quick connector 7 is inserted to be connected to the connection hole 11 so that the seal holding portion 23 is fitted to an outer periphery of the inner cylinder portion 77, (here, a constitution of the seal holding portion 23 of the quick connector 7 is modified).

The connector mounting structure according to the present invention is used, for example, for a coupling of a fluid piping of a motor vehicle, and it becomes possible to easily constitutes a stable piping structure which is extending appropriately.

What is claimed is:

1. A connector mounting structure, comprising:
   a fluid piping equipment provided with a connection hole,
   a retainer mounted on a retainer holding portion formed in a vicinity of an opening of the connection hole and held in an engaging position by the retainer holding portion, the retainer having a pair of engaging arms and a coupling portion connecting the pair of engaging arms,
   a connector inserted into the connection hole, the connector being prevented from dropping out of the connection hole by the retainer, the connector thereby being mounted to the fluid piping equipment,
   wherein the connector comprises:
   a connecting portion having a cylindrical seal portion inserted into the connection hole and sealed with respect to the connection hole by a seal member, and a flange stop portion formed on one end of the seal portion in an axial direction of the connecting portion and engaged with the pair of engaging arms of the retainer in locked relation, and
   a tube fitting portion formed on one end of the connecting portion and extending at an angle from the axial direction,
   wherein a positioning means is disposed between the connecting portion of the connector and the fluid piping equipment, the positioning means comprising a first engaging portion provided on the connecting portion of the connector and a second engaging portion provided on the fluid piping equipment,
   wherein the positioning means positions the connecting portion of the connector in a circumferential direction so as not to rotate relative to the connection hole by engaging the first engaging portion with the second engaging portion in the circumferential direction, the positioning means having a mounting angle adjusting function capable of positioning the connecting portion in the circumferential direction selectively at any one of a number of mounting angular positions relative to the connection hole,
   wherein an annular surface on the other end of the stop portion in the axial direction is formed in a taper shape tapered toward the other end in the axial direction, and is formed so as to press and widen an interval between the pair of engaging arms when the seal portion is inserted into the connection hole,
   wherein the pair of engaging arms of the retainer snap engage with an annular surface on one end of the stop portion in the axial direction when the stop portion passes through the engaging arms, and
   wherein the retainer is mounted on the retainer holding portion so as to be movable between the engaging position and a release position in which the pair of engaging arms are widened to such an extent that the engaging arms are in a non-engaging state with the stop portion, and so as to be held in the release position when the retainer is moved into the release position.

2. The connector mounting structure according to claim 1, wherein the seal portion or the seal member has a smaller outside diameter than the interval between the pair of engaging arms of the retainer.

3. The connector mounting structure according to claim 1, wherein the retainer holding portion comprises an annular body or approximately annular body and defines a through hole, and is configured so that the seal portion and the stop portion pass through the through hole when the seal portion is inserted into the connection hole, and
wherein the first engaging portion is located on an outer periphery of the connecting portion of the connector, and the second engaging portion is provided in the through hole of the retainer holding portion.

4. The connector mounting structure according to claim 3, wherein the first engaging portion is located on the outer periphery of the connecting portion of the connector on one end in the axial direction with respect to the stop portion.

5. The connector mounting structure according to claim 1, wherein one of the first engaging portion and the second engaging portion is an engaging protruding portion, the other of the first engaging portion and the second engaging portion is an engaging recessed portion capable of fitting on the engaging protruding portion, and the number of the engaging recessed portions is equal to or more than the number of the engaging protruding portions.

6. The connector mounting structure according to claim 3, wherein tip portions of the pair of engaging arms are formed into guide engaging portions that are bent and slidable along an outer peripheral edge of the retainer holding portion, the retainer being formed so that the guide engaging portions slide along the outer peripheral edge of the retainer holding portion, and thereby the engaging arms open to release the engagement with the stop portion when the coupling portion of the retainer is pulled in a pull-out direction,
wherein holding recessed portions are provided in the outer peripheral edge of the retainer holding portion, the engaging arms being held in the non-engaging state with the stop portion, while the guide engaging portions are fitted in and held by the holding recessed portions.

7. The connector mounting structure according to claim 1, wherein the retainer is disposed in such position that the pair of engaging arms pass inside of the retainer holding portion in a parallel state with each other.

* * * * *